No. 680,465. Patented Aug. 13, 1901.
G. H. REYNOLDS.
PISTON.
(Application filed Oct. 19, 1900.)
(No Model.)
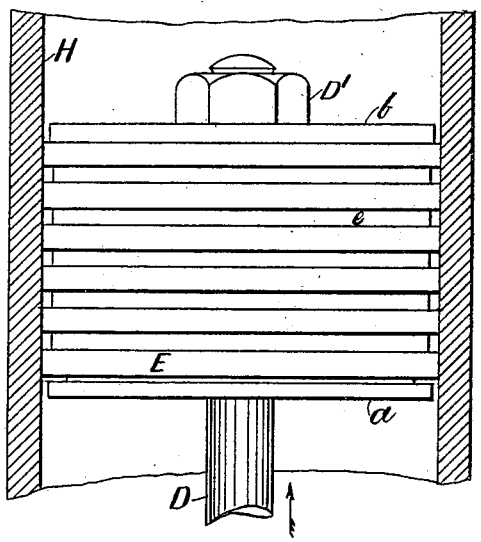
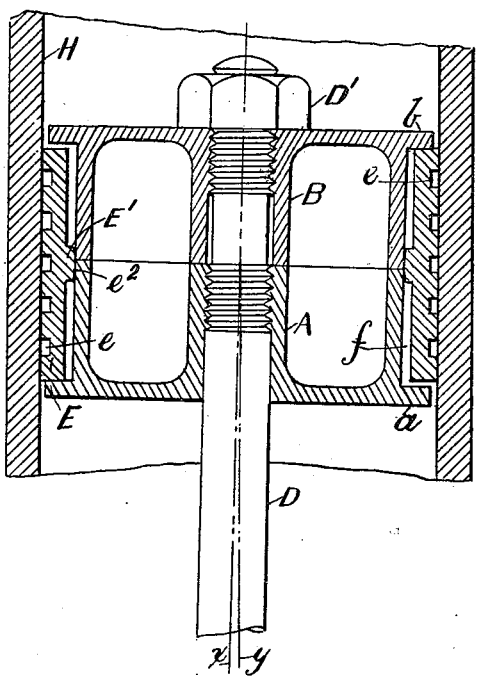
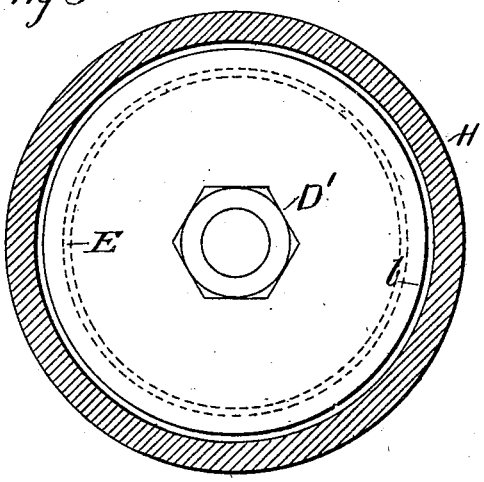
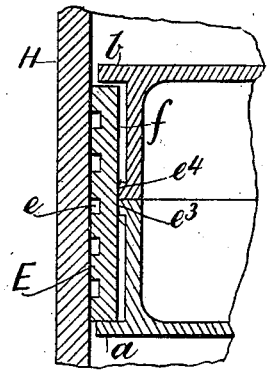
WITNESSES:
INVENTOR
George H. Reynolds
BY
A. A. de Bonneville
ATTORNEY

UNITED STATES PATENT OFFICE.

GEORGE H. REYNOLDS, OF MANSFIELD DEPOT, CONNECTICUT.

PISTON.

SPECIFICATION forming part of Letters Patent No. 680,465, dated August 13, 1901.

Application filed October 19, 1900. Serial No. 33,564. (No model.)

*To all whom it may concern:*

Be it known that I, GEORGE H. REYNOLDS, a citizen of the United States, and a resident of Mansfield Depot, in the county of Tolland and State of Connecticut, have invented certain new and useful Improvements in Pistons, of which the following is a specification.

The object of this invention is the production of a piston which will maintain a continuous-sleeve packing concentric with the bore of the cylinder of an engine, pump, motor, press or the like in which it actuates irrespective of any angularity which may at any time exist between the longitudinal axis of the piston and the axis of the cylinder. To obtain this desirable result with simplicity, I employ a novel construction by which the piston is enabled to rock in any angular position relatively to the continuous-sleeve packing, the latter being always maintained concentric with the cylinder.

With my invention the leakage of continuous-sleeve packing due to faulty alinements in engines, pumps, presses, or the like is absolutely avoided. The axial line of the piston and its piston-rod may make a considerable angle with the longitudinal axis of the cylinder without throwing the packing out of center with the bore of the cylinder.

The applicability of this invention to small engines, and especially to such as are used for automobiles, is evident by virtue of the lightness of construction demanded and the unstable framing of the carriages to which the engines must be attached.

The accompanying drawings represent the preferred forms of my improvements, the details of which may be varied without departing from the spirit of the invention.

Figure 1 represents an elevation of the device in its normal position with a section of its accompanying cylinder on a plane through its longitudinal axis. Fig. 2 shows a section of the piston and its cylinder through the longitudinal axis in one of its operative positions. Fig. 3 is a top view of the invention with a section of its cylinder on a plane perpendicular to its axis. Fig. 4 represents a fragmentary vertical section of a modification of the device on a plane through its longitudinal axis.

The piston is shown in the cylinder H and comprises the body A, with its annular flange $a$, screwed upon the piston-rod D, the follower B, with its annular flange $b$, also screwed upon the said rod, on the end of which the nut D' locks the two portions of the piston in a fluid-tight manner. The flanges $a$ and $b$, with the smaller diameter of both the follower and body of the piston, form a recess $f$ for the continuous-sleeve packing E. The packing is shown to consist of a continuous band or sleeve, being cut or slitted. It contains the circumferential grooves $e$, into which the fluid moved by the piston enters and seals the same with the wall of the cylinder. This latter provision is not, however, essential, as a continuous-sleeve packing without grooves can be fitted to the bore of the cylinder, so as to avoid piston-leakage. The sleeve contains an annular bearing E' midway or approximately midway between its ends. The bearing is slightly curved on its longitudinal surface $e^2$, and by virtue of this bearing, and particularly its equidistant location between the end faces of the sleeve, allows the piston to rock in any direction relatively to the sleeve without tipping it out of alinement with the bore of the cylinder.

The distance between the inner faces of the flanges $a$ and $b$ of the piston is greater than the length or height of the sleeve-packing to prevent the packing being pinched between the said flanges and to allow a fluid-tight joint at the junction of the body of the piston and the follower. This disposition of parts also permits the steam to exert its pressure on one of the end surfaces of the continuous-sleeve packing to seat its opposite end on its adjacent annular flange of the piston, preventing leakage between the piston and the packing.

It will be noted that the diameters of the flanges $a$ and $b$ are both smaller than the internal diameter of the cylinder, which prevents the said flanges from coming in contact with the surface of the cylinder when the piston rocks by reason of the axial lines of the piston and cylinder not coinciding. The annular spaces between the flanges and the cylinder, while they constitute clearance-spaces, are also ports to convey the steam to the adjacent end surfaces of the sleeve-packing to force it in proper operative position.

It will also be noted that the diameter of the piston between its annular flanges and on each side of the annular bearing is smaller than the internal diameter of the sleeve-packing, which is necessary to allow the rocking of the piston.

In Fig. 1 the piston is shown moving up as indicated by the arrow, and the cylinder is supposed to be in perfect alinement with the piston. The fluid-pressure upon the bottom of the piston is shown to have forced the sleeve-packing against the upper flange $b$.

Fig. 2 represents the piston in operative position when it is not in alinement with the bore of the cylinder, the angularity being clearly apparent by the angle between the center lines $x$ and $y$.

Fig. 4 shows a fragmentary sectional elevation of a modification of the device in which the annular bearing is not contained in the sleeve-packing, but projects from both the body of the piston and its follower, although the whole annular bearing could be contained on either portion if placed adjacently midway between the ends of the packing. In the figure one portion of the annular bearing is shown at $e^3$ on the body of the piston and another portion, $e^4$, is represented on the follower. The piston is moving downwardly and the sleeve-packing is shown forced against the bottom flange $a$ of the same by the fluid actuating the said piston.

The efficient manner of securing the body of the piston and its follower by first screwing the same on the piston-rod and then locking them with the nut D' secures a fluid-tight joint at the junction of the two portions of the piston and avoids the possibility of steam or other fluid entering the cavity of the same.

It is evident that the cylinder maintains the sleeve-packing at all times concentric with its bore, and if there is any tendency of the piston and piston-rod to deviate from the axial line of the cylinder it will rock on the annular bearing E', and thereby prevent any pressure being brought on the sleeve-packing near its ends and tip it or throw it out of line.

Having described my invention, I desire to secure by United States Letters Patent and claim—

1. The combination of a threaded piston-rod, a body and a follower screwed upon said rod, a nut on said rod locking the follower and body together in a fluid-tight manner, flanges on the ends of the piston forming a recess upon the surface thereof, and a continuous-sleeve packing in said recess with a clearance between itself and either one of said flanges, the external diameter of said packing being larger than the diameter of the said flanges.

2. The combination with the cylinder of an engine, pump or the like, of a piston whose body and follower have each an annular flange located at the ends of the piston, the said flanges being smaller in diameter than the internal diameter of the cylinder, a circumferential recess on the piston between the flanges, a continuous-sleeve packing in the recess having an internal diameter larger than the diameter of the piston between the flanges, and an external diameter greater than the said flanges, an annular projection formed on the inner surface of the continuous-sleeve packing centrally located between its ends, and clearance between the end faces of the said packing-ring and the flanges of the piston.

3. The combination with a cylinder H, of a piston-rod D, a piston screwed on said rod, annular flanges $a$ and $b$ on the ends of the piston forming a recess upon the surface thereof, a continuous-sleeve packing E in said recess with a clearance between itself and either one of said flanges, circumferential grooves $e$ on the sleeve-packing, an annular bearing between said packing and the piston located centrally between the ends of the sleeve-packing.

Signed at New York, in the county of New York and State of New York, this 18th day of October, A. D. 1900.

GEORGE H. REYNOLDS.

Witnesses:
C. B. HARRIS,
WM. P. FRANCE.